United States Patent

Higgins

Patent Number: 5,898,841
Date of Patent: Apr. 27, 1999

[54] INTER-PROCESSOR COMMUNICATION

[75] Inventor: Brian Higgins, Manchester, United Kingdom

[73] Assignee: International Computers Limited, London, United Kingdom

[21] Appl. No.: 08/802,003

[22] Filed: Feb. 18, 1997

[30] Foreign Application Priority Data

Mar. 19, 1996 [GB] United Kingdom .................... 9606834

[51] Int. Cl.$^6$ ................................................ G06F 13/00
[52] U.S. Cl. ................................ 395/200.66; 395/200.65
[58] Field of Search ................................ 370/466, 469, 370/905, 907; 395/200.6, 200.66, 200.65

[56] References Cited

PUBLICATIONS

Davidson, Introduction to TCP/IP, IDBN 0-387-96651-X, pp. 4-8, 46-54, 1988.

Primary Examiner—Ellis B. Ramirez
Assistant Examiner—William Titcomb
Attorney, Agent, or Firm—Lee, Mann, Smith, McWilliams, Sweeney, Ohlson

[57] ABSTRACT

A multi-processor system has a number of processing elements interconnected by a network for transmitting data frames between the elements. Each element includes an application layer, a transport layer and a link layer. The application layer contains end-point processes each having an address space. The transport layer can allocate a buffer in the address space of a specified end-point process and return details of the buffer to the link layer. The link layer can write message data from a received data frame directly into the allocated buffer by direct memory access without buffering the message data in the link layer. In this way, copying is reduced, improving the efficiency of the system.

9 Claims, 6 Drawing Sheets

FIG. 1

CONTROL FRAME HEADER

| 0 | 1 | 2 | 3 | 4 | | | | 8 | | 10 | | 12 | | 14 | |
|---|---|---|---|---|---|---|---|---|---|---|---|---|---|---|---|
| DA | DL | SA | FT | FLAG | | | | | | CSN | | ASN | | RDS | RFS |

NACK FRAME HEADER

| 0 | 1 | 2 | 3 | 4 | | 6 | | 8 | | | | 12 | | | |
|---|---|---|---|---|---|---|---|---|---|---|---|---|---|---|---|
| DA | DL | SA | FT | ASN | | DSN | | CODE | | | | PADDING | | | |

MAP FRAME HEADER

| 0 | 1 | 2 | 3 | 4 | | 6 | | 8 | |
|---|---|---|---|---|---|---|---|---|---|
| DA | DL | SA | FT | ASN | | DSN | | MAP | |

RELIABLE FRAGMENTED FRAME HEADER

| 0 | 1 | 2 | 3 | 4 | | 6 | | 8 | | 10 | | 12 | |
|---|---|---|---|---|---|---|---|---|---|---|---|---|---|
| DA | DL | SA | FT | ASN | | DSN | | FSN | | LFN | | USER | |

RELIABLE NON-FRAGMENTED FRAME HEADER

| 0 | 1 | 2 | 3 | 4 | | 6 | | 8 | |
|---|---|---|---|---|---|---|---|---|---|
| DA | DL | SA | FT | ASN | | DSN | | USER | |

INTER-PROCESSOR COMMUNICATION

BACKGROUND TO THE INVENTION

This invention relates to communication between processors in a multi-processor computer system.

In a conventional communication protocol, an incoming message is first buffered in a buffer area in the link layer. Protocol header information the message is then examined by the transport layer, to determine which user process the message is intended for. The transport layer can then copy the message data from the buffer area into the user's address space.

A problem with this is that it requires a considerable amount of copying of data, which is inefficient. One object of the present invention is to provide a way of reducing or eliminating such copying.

SUMMARY OF THE INVENTION

According to the invention, a multi-processor system comprises a plurality of processing elements interconnected by a network for transmitting data frames between the elements, each element including an application layer, a transport layer and a link layer, wherein the application layer comprises a plurality of end-point processes each having an address space, wherein the transport layer includes means for allocating a buffer in the address space of a specified end-point process and for returning details of said buffer to the link layer, and wherein the link layer includes means for writing message data from a received data frame directly into said buffer by direct memory access without buffering said message data in the link layer.

DESCRIPTION OF AN EMBODIMENT OF THE INVENTION

One multi-processor system in accordance with the invention will now be described by way of example with reference to the accompanying drawings.

Overview of the system

Figure 1:
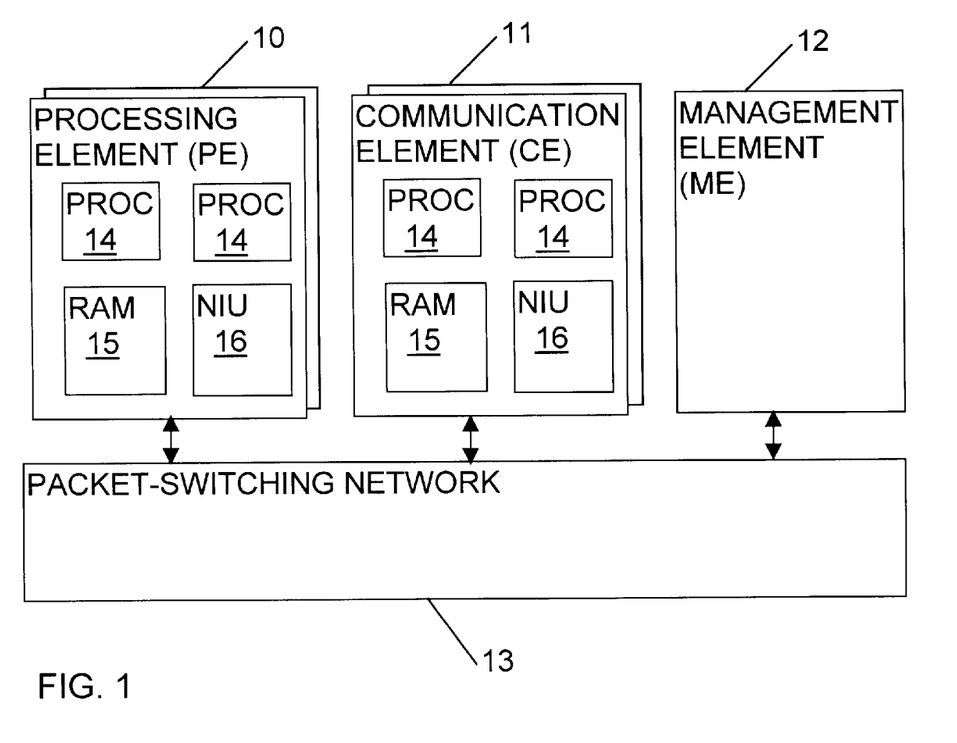
FIG. 1 is a block diagram showing a multi-processor system in accordance with the invention.

Referring to FIG. 1, the system comprises a plurality of processing elements (PEs) 10 and communications elements (CEs) 11, and a single management element (ME) 12 interconnected via a high speed packet-switching network 13. Each PE or CE contains two processors 14, 256 megabytes of RAM storage 15 and a network interface unit (NIU) 16. Each of the PEs have two standard SCSI connections (not shown) for up to twelve discs. Each CE is fitted with two Fibre Distributed Data Interface (FDDI) couplers (not shown), which provide external network connections, but only has SCSI connections for at most six discs. The management element 12 is an ICL DRS6000 computer (ICL and DRS6000 are trademarks of International Computers Ltd); its function is to control the establishment, closedown and software installation of the rest of the system, along with other system management tasks.

The network 13 allows data to be transmitted from any of the elements (PE, CE or ME) to any other of the elements. Each element has a network address in the range 0 to 63 which uniquely identifies it in the system and is used for routing data through the network. When there is no contention within the network, the network can support data transfer between any two elements at a rate of about 20 megabytes per second.

Data is transmitted over the network in units referred to herein as frames. Each frame consists of a fixed-length 16 byte header, followed by from 0 to 128 bytes of frame data. Each frame has a 16-bit cyclic redundancy checksum (CRC) associated with it, to allow the transmission of each frame to be checked.

Frame header format

Figure 2:
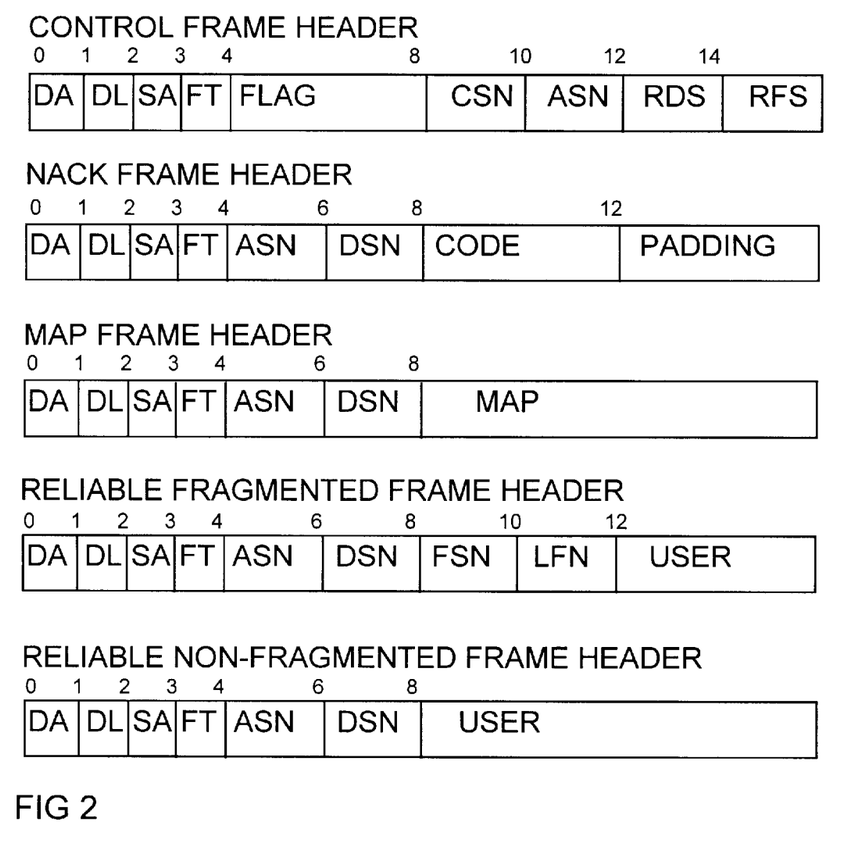
FIG. 2 is a schematic diagram showing formats for frame headers used in the system.

FIG. 2 shows formats of a number of different types of frame header. The significance of the various header fields is as follows.

DA is a destination address byte, indicating the network address of the element to which the frame is to be routed.

DL is a frame data length byte, indicating the number of data bytes in the frame (0 to 128).

SA is a source address byte, indicating the network address of the element from which the frame is being sent.

FT is a frame type byte, and represents the following seven different frame types:

| type code | frame type |
|-----------|------------|
| 0 | Control frame |
| 1 | NACK (negative acknowledgement) frame |
| 2 | MAP frame |
| 3–63 | Reliable non-fragmented datagram |
| 64–127 | Unreliable non-fragmented datagram |
| 128–191 | Unreliable fragmented datagram |
| 192–255 | Reliable fragmented datagram. |

The first three frame types are reserved for use by the link layer, and have a zero frame data length (i.e. DL=0). The remaining types are used for the transmission of datagrams, and in this case the frame type code implicitly indicates whether the datagram is reliable or unreliable, and whether it non-fragmented (i.e. is no longer than 128 bytes and can therefore be transmitted in a single frame) or fragmented (i.e. is longer than 128 bytes and therefore has to be transmitted as several frames).

FLAG is a flag field, used in control frames. FLAG=0 indicates that the control frame is an unsolicited acknowledgement frame (ACK); FLAG=1 indicates that it is a retransmission request. Unsolicited ACK frames are not normally required, because all reliable frames carry acknowledgement sequence numbers. As will be described, an unsolicited ACK frame is sent only if no reliable frames have been sent for a certain time.

CSN is a control sequence number, which is carried by a retransmission request. These control sequence numbers are distinct from the datagram sequence numbers carried by other reliable frames. This allows a retransmission request to be transmitted at any point in the stream of reliable frames, even in the middle of the set of frames for a fragmented datagram.

ASN is an acknowledgement sequence number. This is the sequence number of a datagram that is being explicitly acknowledged. It also implicitly acknowledges all datagrams with sequence numbers before the acknowledged datagram.

RDS and RFS are a retransmit datagram sequence number, and a retransmit frame sequence number. These are used in retransmission requests to indicate where retransmission is to start. Hence, retransmission need not start from the beginning of the failing datagram.

DSN is the datagram sequence number of the current datagram.

CODE is a reason code, and is used by a NACK frame to indicate the reason for a reception error.

MAP is a reliability map.

FSN indicates the sequence number of the current frame within a reliable fragmented datagram.

LFN indicates the frame sequence number of the last frame in a reliable fragmented datagram.

USER is a user header field which can be used by higher layers to carry user header information. The transport layer exploits this field for carrying control protocol data units (PDUs) so that no additional protocol header needs to be prepended to the user data in the buffer. These PDUs identify the end-point processes to which the datagrams are to be delivered. Reliable fragmented headers contain four bytes of user header, while reliable non-fragmented datagrams contain eight bytes of user header.

Communications protocol

Figure 3:
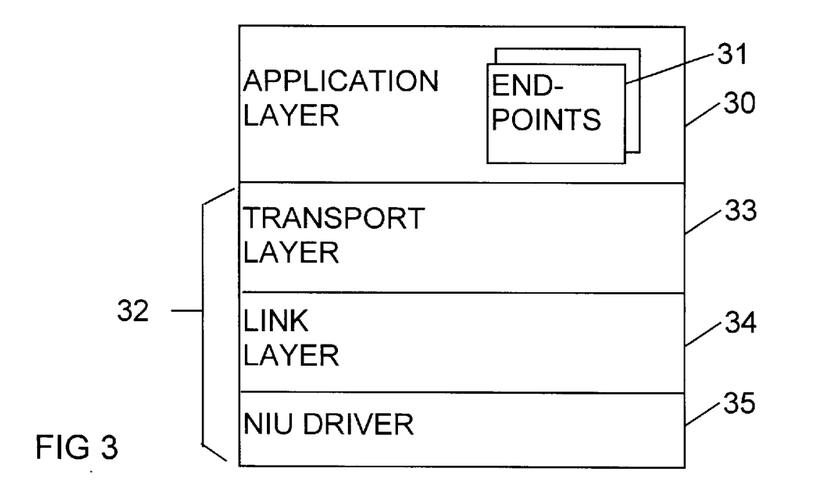
FIG. 3 is a block diagram showing communications software in the system.

Referring to FIG. 3, each element (PE, CE or ME) contains an applications layer 30 containing a plurality of end-point processes 31. Each element also includes communications protocol software 32 for enabling the end-point processes 31 to communicate over the network 13 with end-point processes resident on the other elements. The communications protocol software in each element comprises a transport layer 33, a link layer 34, and an NIU driver 35.

The NIU driver 35 provides a simple frame transmission and reception service to the link layer.

Link layer

The link layer 34 provides a transmit_datagram function which the transport layer can call whenever it wishes to transmit a datagram. Two services are provided: an unreliable service and a reliable service. The reliable link layer service provides a connectionless datagram service, with the following features: P1 Error free delivery of datagrams up to 8 megabytes.

In-order delivery. Datagrams always arrive at their destination in the same order as they were transmitted from their source.

Guaranteed once-only delivery. A datagram is either successfully delivered to its destination exactly once, or the sender is given an error report indicating the reason for non-delivery (for example, no suitable buffer available). Senders may, optionally, request termination reports for successful delivery.

The link layer provides datagram fragmentation and re-assembly, as well as sequence numbering, acknowledgement and retransmission protocols needed to support these service semantics.

It should be noted that the link layer itself does not provide any buffering. It is the responsibility of the transport layer to provide the buffers for both outgoing and incoming datagrams.

Transport layer

The transport layer 33 provides the following services to the application layer above it:

A connection-oriented transport service for passing ordered streams of messages between pairs of end-point processes on any PE or CE. Messages may be up to 8 megabytes long, and the transport service provides full flow control to guarantee that a buffer is always available when a message arrives.

A connectionless transport service for passing unit data messages between end-point processes on any PE or CE in the system. Unlike the connection-oriented service, connectionless end points are not associated in pairs. A message of up to 8 megabytes may be sent from any end point to any other end point. The arrival order of messages from different source end points is arbitrary and the transport provides no flow control.

A buffer pool management service. This can be called by an end-point process to create a buffer pool in the process's address space, and automatically expands and contracts the pool as demand for buffers changes. Details of the buffer pools associated with the end-point processes are held in tables.

A buffer set management service. This manages buffer sets created by the end-point processes themselves. Details of the buffer sets associated with the end-point processes are held in tables.

An element management service which allows processes to use the facilities of an element status service provided by the link layer, as will be described below.

The transport layer also provides the following four functions which can be called by the link layer:

A get_buffer function which allocates a buffer from the buffer pool or set of a specified end-point process, and returns details of the allocated buffer to the link layer.

A return_buffer function for releasing a previously allocated buffer.

A receive_datagram function which notifies an end-point process that a completely reassembled datagram is now available in a specified buffer.

A transmission_termination function which notifies an end-point process that datagram delivery has been terminated.

When the transport layer wishes to use a link layer service, it binds to one or more frame types, the type of service (reliable or unreliable) being implicit in the frame type bound to. In the process of binding to a frame type, the transport layer exchanges function pointers with the link layer. The link layer returns to the transport layer a single function pointer for its transmit_datagram function. In return, the transport layer provides the link layer with four function pointers, to its return_buffer, transmission_termination, get_buffer, and receive_datagram functions.

Element status service

In addition to its datagram services described above, the link layer provides an element status service, for indicating the statuses of all the elements in the system. The transport layer attaches to this service, and receives a function call whenever the status of any PE or CE changes; for example, when an element leaves the reliable service after crashing. In this way, the transport layer avoids the overheads of using timeouts and "keep awake ACKs" incurred by conventional transport services.

An element can have one of the following externally visible, statuses:

UNAVAILABLE. The element is isolated from the rest of the system. No frames of any type are sent to the element and any frames which arrive from the element are discarded.

UNRELIABLE. The element is not participating in the global filestore or database services. Only unreliable frames may be sent to the element and any reliable frames which arrive from the element are discarded.

RELIABLE. The element is participating in global filestore and database services. All frame types can be sent to, and received from, the element.

In addition, there are two transient, internal statuses only visible within the link layer:

JOINING. The element is intended to have RELIABLE status but has not yet established contact with all RELIABLE elements.

LEAVING. The element did have RELIABLE status but has temporarily lost contact with some RELIABLE elements.

Each element holds a status table indicating its view of the statuses of all the elements in the system, including itself. On each PE and CE, the status of the element itself and of the ME is initially set to UNRELIABLE, and the status of all other elements is initially set to UNAVAILABLE. During the early stages of system establishment, system management software on each PE and CE obtains details of the actual element configuration from the ME and passes these details on to the link layer. Elements which are to participate in the reliable service (i.e. those which should eventually get to RELIABLE status) are then given JOINING status.

Each element also maintains a 64-bit reliability map, having one bit for each element in the system, including itself. As will be described, bit n of this map is set when the element is regularly receiving reliable frames from element n. This map is initially all zeros. Each element also holds local copies of the reliability maps of all the other elements.

As will be described, the elements use a consensus voting mechanism to decide on the status of each element. This ensures that all elements have the same view of element statuses.

Operation of link layer

The operation of the link layer will now be described in more detail with reference to FIGS. 4 to 9.

The link layer has a watchdog timer which produces a "tick" every 50 milliseconds.

The link layer maintains the following arrays of count values:

| | |
|---|---|
| NSENT[n] | the number of datagrams sent to element n without receiving an ACK. |
| NREC[n] | the number of datagrams received from element n without returning an ACK. |
| WSENT[n] | the number of watchdog ticks since the last frame was sent to element n. |
| WREC[n] | the number of watchdog ticks since the last frame was received from element n. |
| RREQ[n] | the number of receipts of a particular retransmission request from element n. |
| TIME[n] | the number of watchdog ticks in a joining/leaving timeout for element n. |

Figure 4:
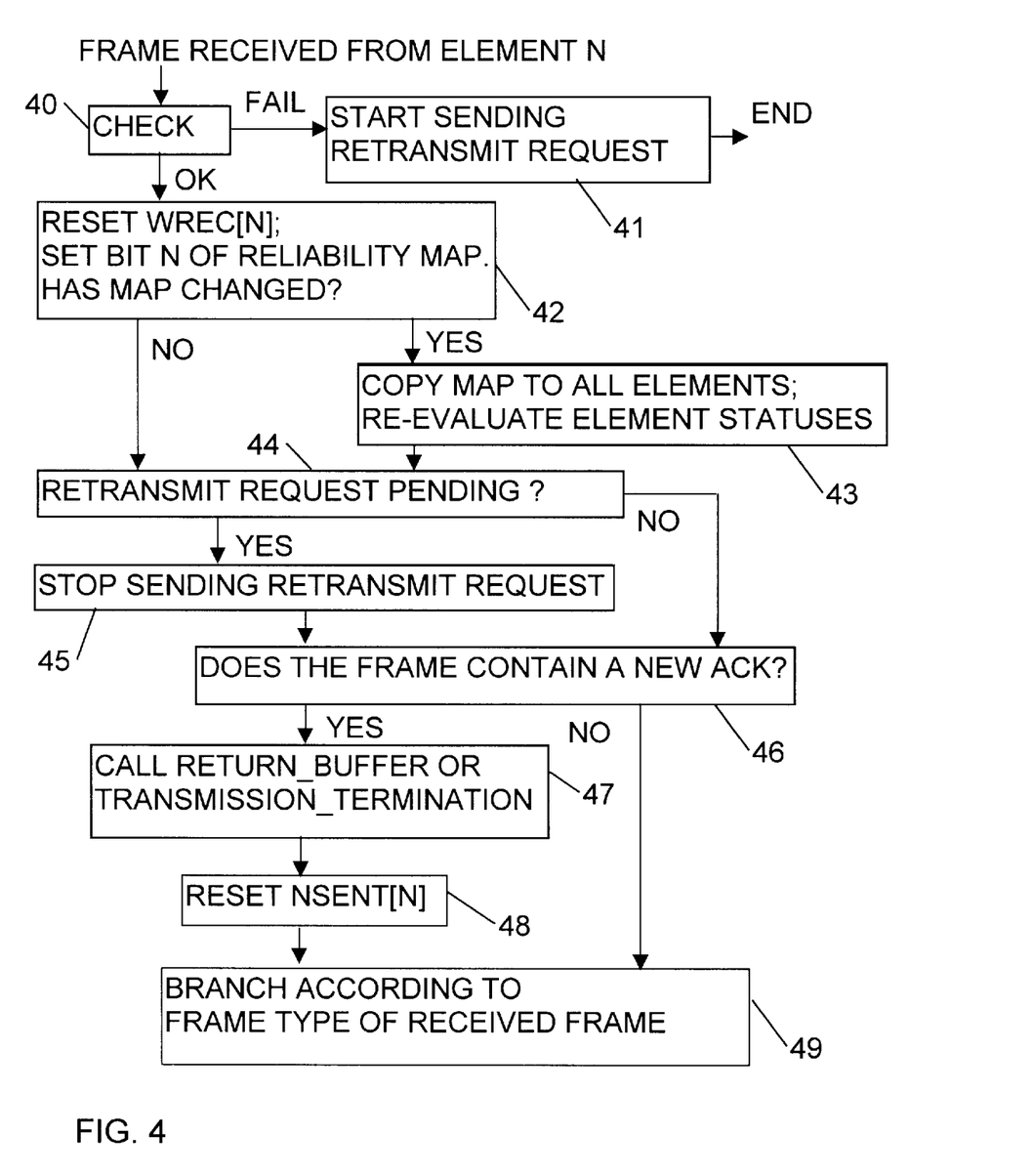
FIGS. 4–9 are flowcharts showing the operation of a link layer.

FIG. 4 shows the action of the link layer when a frame is received from element n.

(Step 40) The link layer first checks the frame's CRC to ensure there have been no transmission errors. In the case of a fragmented reliable frame, the link layer also checks the frame sequence number, to ensure that no frames have been lost. For both fragmented and non-fragmented frames, the datagram sequence number (DSN) is also checked to ensure that one or more complete datagrams have not been lost.

(Step 41) If an error is detected, the link layer sends a retransmission request. The request is automatically repeated every 200 milliseconds, until terminated by the link layer as described below.

(Step 42) Assuming no error was detected, the count WREC[n], i.e. the number of watchdog ticks without a frame from element n, is reset to zero. Also, bit n of the reliability map is set. The link layer then checks whether the reliability map has changed. If the reliability map has changed, the process goes to Step 43; otherwise, it goes to Step 44.

(Step 43) The link layer sends a MAP frame, containing a copy of its reliability map, to all the other elements. It then performs a re-evaluation routine (to be described with reference to FIG. 9), which re-evaluates the statuses of all the elements.

(Step 44) The link layer then checks whether any retransmission request is currently pending for the received frame. If so, the process goes to Step 45; otherwise, it goes to Step 46.

(Step 45) The link layer stops sending retransmission requests for this frame.

(Step 46) The link layer then checks whether the acknowledgement sequence number ASN is different from that in the previous frame (i.e. the frame contains a new acknowledgement). If so, the process goes to Step 47; otherwise it goes to Step 49.

(Step 47) The link layer calls the return_buffer function of the transport layer, requesting it to release all buffers associated with the acknowledged datagram or datagrams. Alternatively, if a normal termination has been requested, the transmission_termination function is called instead of the return_buffer function.

(Step 48) The count NSENT[n], i.e. the number of datagrams sent to element n without receiving an ACK, is then reset to zero.

Figure 5:
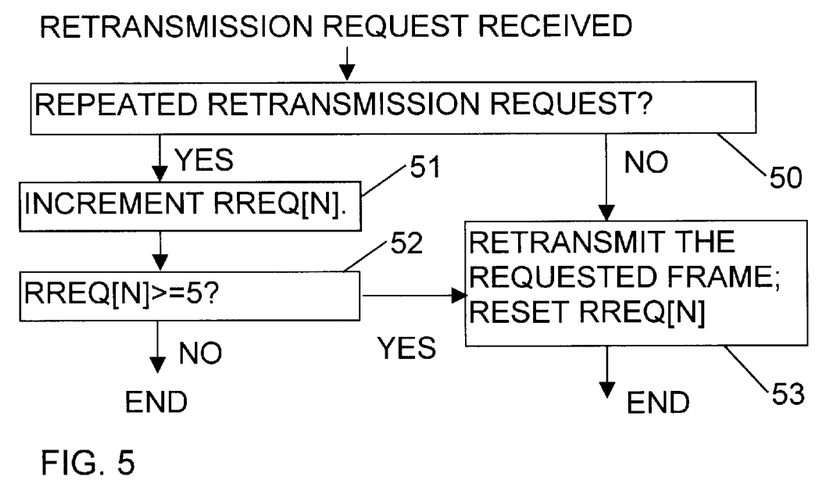
Figure 6:
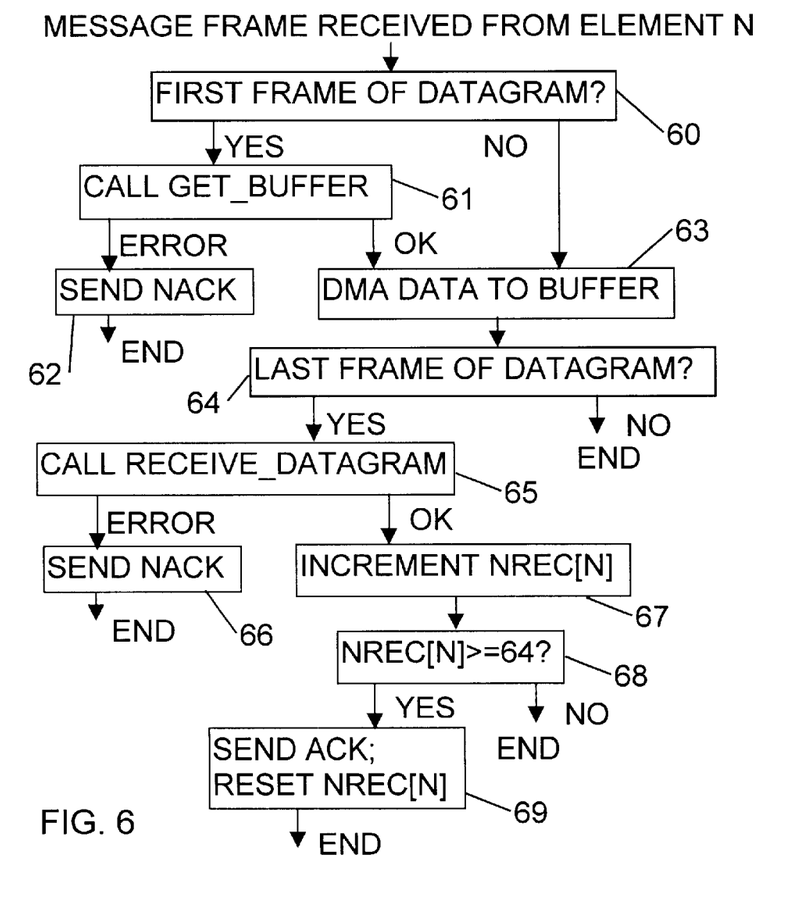

(Step 49) The link layer then branches according to the frame type of the received frame. If the frame was an unsolicited ACK frame, no further action is required. If the frame was a retransmission request, the subroutine shown in FIG. 5 is performed. If the frame was a NACK frame, the transmission_termination function of the transport layer is called, to terminate the transmission of the datagram specified in the NACK. If the frame was a MAP frame, containing map data which is different from the current local copy of element n's reliability map, that local copy is updated and the element statuses are re-evaluated. If the frame was a message frame, the subroutine shown in FIG. 6 is performed.

FIG. 5 shows the subroutine for processing a retransmission request.

(Step 50) The link layer first checks whether the retransmission request is a repeat of a previously received one, i.e. whether the retransmit datagram sequence number RDS and retransmit frame sequence number RDF in the retransmission request are both the same as in a previously received retransmission request. If so, the subroutine goes to Step 51; otherwise it goes to Step 53.

(Step 51) The link layer increments the count RREQ[n], i.e. the number of times this retransmission request has been received.

(Step 52) The link layer then checks the count RREQ[n]. If the count is greater than or equal to 5, the subroutine goes to Step 53; otherwise it exits without performing any further action.

(Step 53) The link layer retransmits the requested frame, and resets RREQ[n] to zero.

It can be seen from the above description of FIGS. 4 and 5 that a retransmission request frame is automatically re-sent every 200 milliseconds until the request has been satisfied. Received retransmission requests with the same sequence number as the previous request are ignored until five duplicate requests have arrived. At that point it is assumed that the retransmitted frame has itself been lost or corrupted, and so the retransmission is repeated. This ensures that, no matter what the circumstances, a retransmission request will always eventually succeed.

FIG. 6 shows the subroutine for processing a message frame.

(Step 60) The link layer first checks whether this is the first frame of a datagram. If so, it goes to Step 61; otherwise it goes to Step 63.

(Step 61) The link layer calls the transport layer's get_buffer function, passing it the frame type, source element address, a pointer to the USER field of the frame header, and the size of buffer required. In response to this call, the get_buffer function accesses the USER field to obtain the identity of the end-point process to which the datagram is to be delivered, and looks up the appropriate table to obtain details of the buffer pool or set associated with this end-point process. The get_buffer function then allocates a suitable buffer from this buffer pool or set, and returns details of the allocated buffer to the link layer. If the get_buffer function returns an error, the process goes to Step 62; otherwise it goes to Step 63.

(Step 62) The link layer sends a NACK frame to the source element from which the message frame was received, and then exits.

(Step 63) The link layer performs a direct memory access (DMA) operation, to write the message data directly into the allocated buffer in the end-point process's address space. It should be noted that, because the data is written directly, no copying of the data between buffers is required.

(Step 64) The link layer then checks whether the received frame is the last frame of the current datagram. If so, the process goes to Step 65; otherwise it exits.

(Step 65) The link layer calls the transport layer's receive_datagram function, to notify it that the datagram is now available in the allocated buffer. If the receive_datagram function returns an error, the process goes to Step 66; otherwise it goes to Step 67.

(Step 66) The link layer sends a NACK frame to the source element from which the message frame was received, and then exits.

(Step 67) The link layer increments the count NREC[n], i.e. the number of datagrams received from element n without returning an ACK.

(Step 68) The link layer then checks the count NREC[n]. If it is greater than or equal to 64, the process goes to Step 69; otherwise it exits.

(Step 69) The link layer sends an unsolicited ACK (i.e. a control frame with FLAG=0) to element n, and resets the count NREC[n] to zero.

Figure 7:
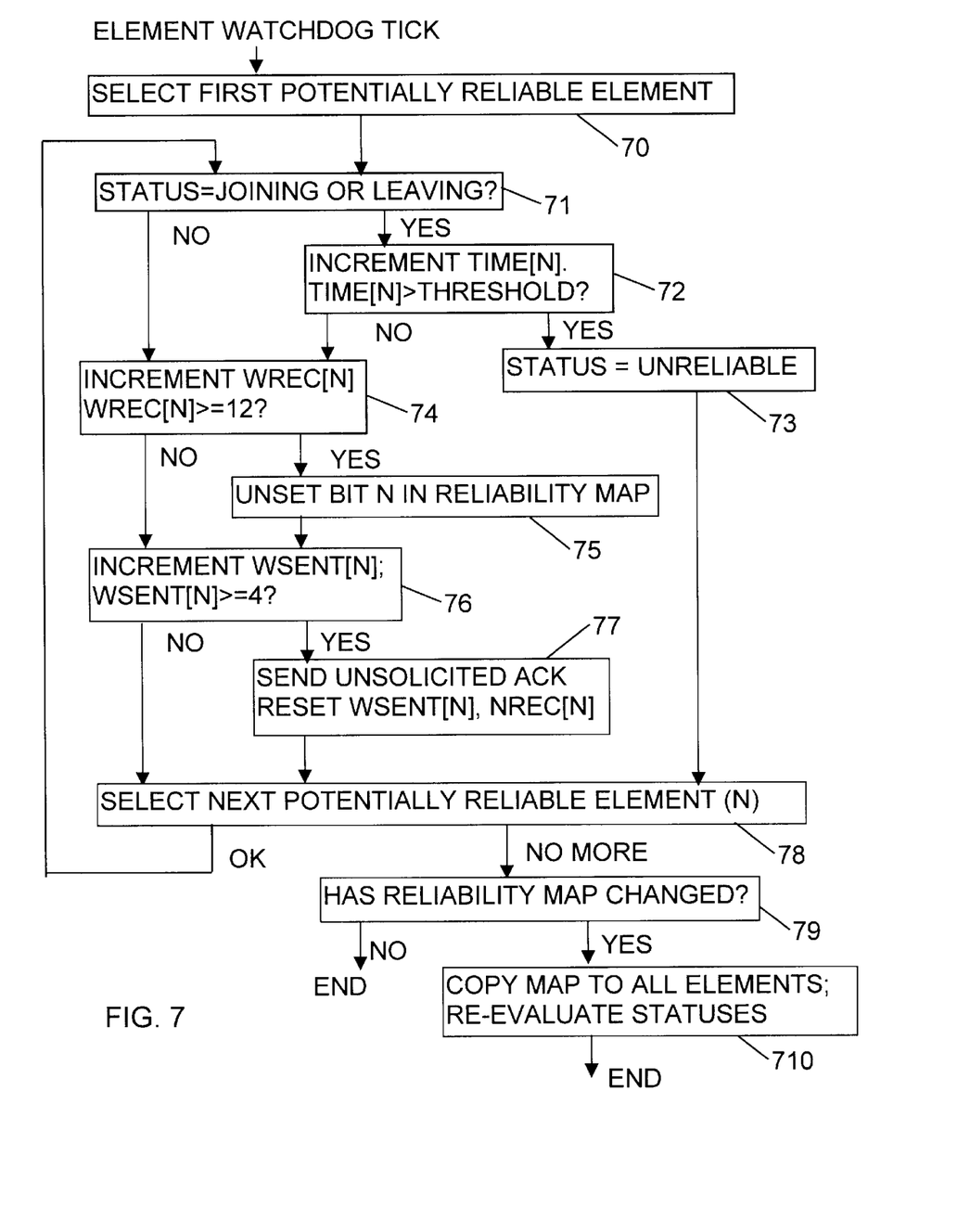

FIG. 7 shows the action of the link layer whenever a watchdog tick occurs (i.e. every 50 milliseconds). This action is performed only in potentially reliable elements, i.e. elements with RELIABLE, JOINING or LEAVING status.

(Step 70) The link layer initially selects the first potentially reliable element (n).

(Step 71) The link layer checks whether the status of element n is JOINING or LEAVING. If so, the process goes to Step 72; otherwise, it goes to Step 74.

(Step 72) The link layer increments the count TIME[n], i.e. the number of watchdog ticks in the joining/leaving timeout for element n. This count is then compared with a threshold value, equal to 200 if the status is LEAVING, and 6000 if the status is JOINING. If the count is greater than or equal to the threshold, the process goes to Step 73; otherwise it goes to Step 74.

(Step 73) The status of element n is set to UNRELIABLE. The process then goes to Step 78.

(Step 74) If the status of element n is not JOINING or LEAVING, it must be RELIABLE. In this case, the link layer checks the count WREC[n], i.e. the number of watchdog ticks without a frame from element n. If WREC[n] is greater than or equal to 12, the process goes to Step 75; otherwise it goes to Step 76.

(Step 75) Bit n in the reliability map is unset.

(Step 76) The link layer then increments by one the count WSENT[n], i.e. the number of watchdog ticks since the last frame was sent to element n, and compares WSENT[n] with 4. If WSENT[n] is greater than or equal to 4, the process goes to Step 77; otherwise it goes to Step 78.

(Step 77) The link layer sends an unsolicited ACK (i.e. a control frame with FLAG=0) to element n. The link layer then resets the counts WSENT[n] and NREC[n] to zero.

(Step 78) The procedure then selects the next potentially reliable element, and loops back to Step 71. The loop (Steps 71–78) is repeated for each potentially reliable element.

(Step 79) When all the potentially reliable elements have been considered, the link layer checks whether its reliability map has changed. If not, no further action is required.

(Step 710) If the reliability map has changed, the link layer sends a MAP frame, containing a copy of its updated reliability map, to all other elements. It also performs the re-evaluation procedure, to re-evaluate the statuses of all elements.

Figure 8:
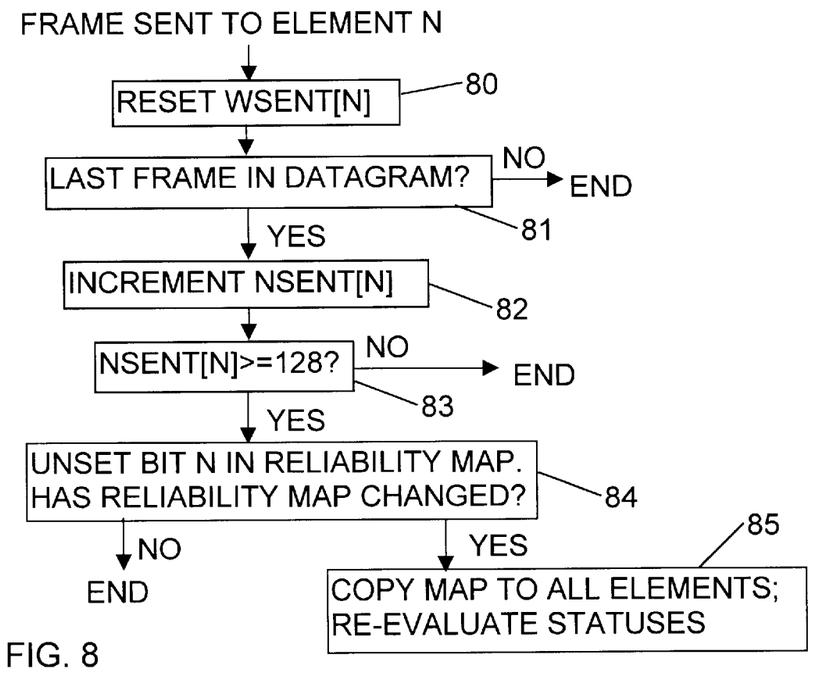

FIG. 8 shows operations performed by the link layer whenever it sends a frame to element n.

(Step 80) The count WSENT[n], i.e. the number of watchdog ticks since the last frame was sent to element n, is reset to zero.

(Step 81) If this is not the last frame of the datagram, no further action is required. ( Step 82) If this is the last frame, the count NSENT[n], i.e. the number of datagrams sent to element n without receiving an ACK, is incremented by one.

(Step 83) If NSENT[n] is less than 128, no further action is required.

(Step 84) If, NSENT[n] is greater than or equal to 128, bit n in the reliability map is unset.

(Step 85) If the reliability map has now changed, the link layer sends a MAP frame, containing a copy of its updated reliability map, to all other elements. It also performs the re-evaluation procedure, to re-evaluate the statuses of all elements.

Re-evaluation of element statuses

Figure 9:
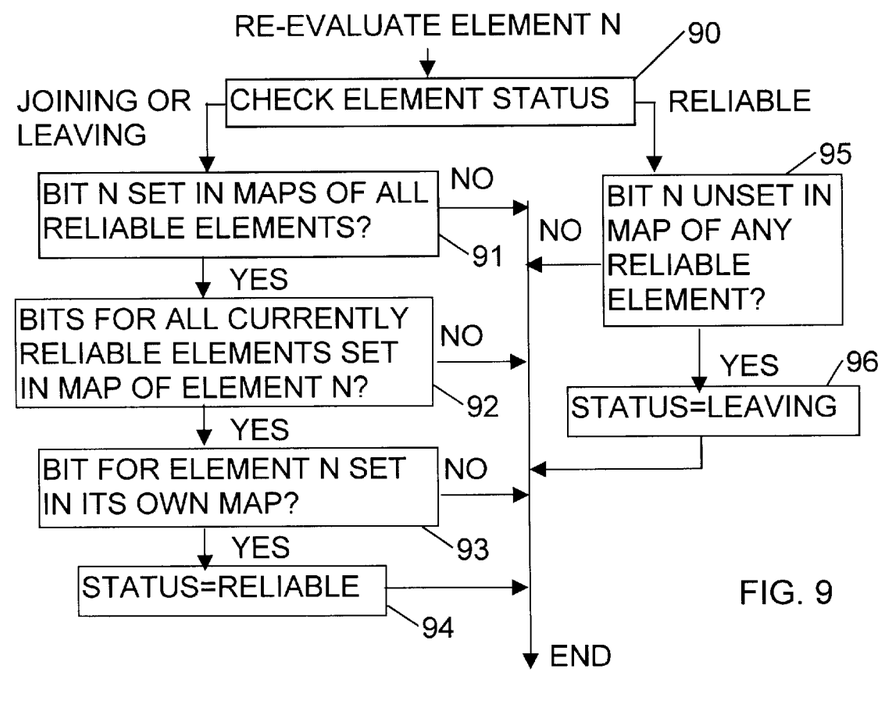

FIG. 9 shows the process for re-evaluating the status of element n. This process is performed in respect of each potentially reliable element in turn, i.e. elements with RELIABLE, JOINING or LEAVING status.

(Step 90) The status of element n is checked. If the status is JOINING or LEAVING, the process goes to Step 91; if the status is RELIABLE it goes to Step 95.

(Step 91) The process checks whether bit n is set in the reliability maps of all currently RELIABLE elements.

(Step 92) The process checks whether bits for all currently RELIABLE elements are set in element n's reliability map.

(Step 93) The process checks whether the bit for element n is set in element n's reliability map.

(Step 94) If all three of the above tests (Steps 91–93) are satisfied, the status of element n is changed to RELIABLE. Otherwise, it is left unchanged.

(Step 95) If element n's status is RELIABLE, the process checks bit n of the reliability maps of all currently RELIABLE elements.

(Step 96) If bit n is unset in the map of any currently RELIABLE element, the status of element n is changed to LEAVING.

Discussion of the status mechanism

In summary, it can be seen from the above description that all potentially reliable elements (i.e. elements with RELIABLE, JOINING or LEAVING status) monitor all other elements with those statuses by executing an element watchdog function every 50 milliseconds. Each potentially reliable element stays in contact with every other potentially reliable element by ensuring that at least one reliable frame is sent to each such element (including itself) every 200 milliseconds. In the absence of other reliable traffic, this is done by transmitting an unsolicited ACK control frame on every fourth watchdog timer tick.

Whenever a potentially reliable element receives a reliable frame from the element with address n, it sets bit n in its reliability map. Conversely, if no reliable frame is received from the element for 600 milliseconds, the bit is unset.

Each element is expected to send an explicit or implicit acknowledgement for at least every 64th datagram received. If an element sends 128 datagrams to another element without receiving any acknowledgement then the destination element's bit in the reliability map is unset.

Whenever an element's reliability map changes, a copy of it is transmitted in a MAP frame to every other element. Each element stores the reliability maps received from all other elements, and whenever any map changes, the status of all elements is re-evaluated.

Elements are not allowed to have JOINING or LEAVING status indefinitely. A timeout is applied, and if an element has one of these statuses for longer than the timeout then its status is changed to UNRELIABLE.

The situation is analogous to a club where membership is obtained by a unanimous vote from the existing members and where a member has to leave if any vote is withdrawn. RELIABLE elements are the club members, JOINING and LEAVING elements are the potential members. All members and potential members can register a set of votes (a reliability bit map), but only the votes of members are counted. A new member will not invalidate any existing membership or the membership of the joiner. Since all members and potential members know each other's votes, they all come to the same conclusions about the set of members.

The mechanism needs no special case to cope with the first RELIABLE element. When an element's own status is first changed from UNRELIABLE to JOINING, there can be no RELIABLE elements. The element transmits an unsolicited ACK control frame to itself. When this is received it sets its own bit in its own bit map (at Step 42) and immediately satisfies the conditions for RELIABLE status given above, and the status change is performed.

The algorithm will always, eventually, produce a system-wide consistent set of element statuses as long as there is not some complete communications breakdown. Consider, for example, the case where a network fault makes it impossible for two elements A and B to communicate with each other but where A and B can still communicate with all other elements. A will change B's status to LEAVING, unset B's bit in its map and send this to all other elements; B will do the converse. Now suppose that a subset of the other elements (the A group) receive A's map frame before B's and the remainder (the B group) receive B's map frame before A's. When the algorithm has been applied by all these elements then, within the A group (including A itself), element A has status RELIABLE and element B has status LEAVING; the converse applies in the B group. Ten seconds later each element in each group will timeout the element with status LEAVING, change its status to UNRELIABLE, unset the corresponding bit in its own bit map and send this to all other elements. These map frames will cause the A group to change A's status to LEAVING and the B group to set B's status to LEAVING. After another ten second timeout, every element in the system will have status UNRELIABLE for both A and B.

Discussion of copy-free buffering feature

It can be seen that the link layer itself does not provide any buffering. It is the responsibility of the transport layer to provide buffers in the user's address space, for both outgoing and incoming datagrams, and the message data is written directly into these buffers using direct memory access. Thus, messages do not need to be copied from one buffer to another as in existing protocols.

An important factor contributing to this copy-free operation is the fact that all the transport layer's protocol is carried in the user header field of the frame header, rather than being prepended to the message data as is usually the case. If the transport layer's protocol were not in the user header (say it was the first 4 or 8 bytes of the frame data) then the transport layer would not know which process's address space to allocate a buffer in until after the DMA, by which time it is too late. It would have to do the same as conventional protocols, that is: allocate a supervisor space buffer, DMA into that, then extract its header, get a user space buffer and copy the rest of the data into that.

The effect of this novel design described above is that the transport layer, passing large (64 kilobyte) messages from a process on one element to a process on another element, can achieve a measured throughput of about 17 megabytes per second. This is approximately ten times greater than the throughput which can be achieved using a conventional transport, such as TCP, over the same network.

I claim:

1. A multi-processor system comprising a plurality of processing elements interconnected by a network for transmitting data frames between the elements, each element including an application layer, a transport layer and a link layer,
   wherein the application layer comprises a plurality of end-point processes each having an address space,
   wherein the transport layer includes a get buffer function, for allocating a buffer in the address space of a specified end-point process and for returning details of said buffer to the link layer,
   and wherein the link layer includes:
   (a) means for receiving a data frame comprising a frame header followed by message data, said frame header including a field containing transport layer protocol information identifying one of said end-point processes to which said message data is to be passed,
   (b) means operative after receipt of said frame header and before receipt of said message data, for calling said get buffer function of said transport layer to allocate a buffer in the address space of said one of said end-point process, and
   (c) means for writing said message data from said data frame directly into said buffer by direct memory access without buffering said message data in the link layer.

2. A multi-processor system according to claim 1 wherein said get buffer call includes a pointer to said field containing transport layer protocol information.

3. A multi-processor system according to claim 2 wherein the transport layer includes means operative upon receipt of said get_buffer call, for accessing said field containing transport layer protocol information, and allocating a buffer in the address space of the end-point process identified by said transport layer protocol information.

4. A multi-processor system according to claim 1 wherein the frame header of each of at least some of said data frames includes an acknowledgement field for acknowledging receipt of one or more data frames.

5. A multi-processor system according to claim 4 wherein said acknowledgement field implicitly acknowledges receipt of all data frames up to and including a specified frame.

6. A multi-processor system according to claim 4 wherein said link layer includes means operative in response to receipt of an acknowledgement, for issuing a return_buffer call to the transport layer, requesting it to release all buffers associated with the acknowledged data frames.

7. A multi-processor system according to claim 4 wherein said link layer includes means for sending an acknowledgement frame to one of said processing elements in the event that a predetermined time has elapsed without sending any data frames to said one of said processing elements.

8. A multi-processor system according to claim 1 wherein said link layer comprises means for checking each received data frame and, in the event of detecting an error in a frame received from a particular processing element, for sending a retransmission request frame to said particular processing element.

9. A method of operating a multi-processor system comprising a plurality of processing elements interconnected by a network for transmitting data frames between the elements, each element including an application layer, a transport layer and a link layer, the method comprising:

(a) sending a data frame from a first one of said processing elements to a second one of said processing elements, said data frame comprising a frame header followed by message data, said frame header including information identifying an end-point process to which the data frame is to be delivered in said second one of said processing elements;

(b) in said second one of said processing elements, upon receipt of said frame header and before receipt of said message data, accessing said information identifying the end-point process to which the data frame is to be delivered and allocating a buffer in the address space of said end-point process for receiving said message data; and (c) in said second one of said processing elements, upon receipt of said message data, writing said message data directly into said buffer by direct memory access without buffering said message data in the link layer.

\* \* \* \* \*